United States Patent [11] 3,553,399

[72] Inventors Ralph T. Osen
St. Louis Park;
Keith D. Bolster, Mound, Minn.
[21] Appl. No. 751,845
[22] Filed Aug. 12, 1968
[45] Patented Jan. 5, 1971
[73] Assignee Honewell Inc.
Minneapolis, Minn.
a corporation of Delaware

[54] ANTIDISTURBANCE SWITCH WITH CONDUCTIVE HOUSING TOP AND BOTTOM AND PRINTED CIRCUIT GRID
6 Claims, 4 Drawing Figs.

[52] U.S. Cl. .......... 200/61.45
[51] Int. Cl. .......... H01h 35/14
[50] Field of Search .......... 200/61.45, 61.52, 52Ball, 166CPC; 102/70.2(Cursory)

[56] References Cited
UNITED STATES PATENTS

| | | | |
|---|---|---|---|
| 3,509,298 | 4/1970 | Kirk .......... | 200/61.45 |
| 1,203,220 | 10/1916 | Macy .......... | 200/52(Ball)X |
| 2,182,300 | 12/1939 | McCandless .......... | 200/61.52 |
| 2,208,426 | 7/1940 | Livingston .......... | 200/52(Ball)X |
| 3,372,253 | 3/1968 | Baker et al. .......... | 200/61.45 |

*Primary Examiner*—H. O. Jones
*Assistant Examiner*—Robert A. Vanderhye
*Attorneys*—Charles J. Ungemach, Ronald T. Reiling and Al Medved

ABSTRACT: An antidisturbance or trembler switch for providing a switching function when forces external to the switch introduce relative motion between a conductive sphere and a cylindrical housing.

INVENTORS
KEITH D. BOLSTER
RALPH T. OSEN
BY Albin Medved
ATTORNEY

INVENTORS
KEITH D. BOLSTER
RALPH T. OSEN
BY Albin Medved
ATTORNEY

ANTIDISTURBANCE SWITCH WITH CONDUCTIVE HOUSING TOP AND BOTTOM AND PRINTED CIRCUIT GRID

The invention herein described was made in the course of or under a contract with the Department of the Air Force.

BACKGROUND OF THE INVENTION

1. Field of the Invention

The present invention pertains generally to the field of electrical switches and more particularly to electrical switches actuated by a disturbance of the switch.

2. Description of the Prior Art

Various antidisturbance switches are known in the prior art. The size and complexity of the prior art switches makes them inefficient to utilize and expensive to produce. Furthermore, the prior art switches are often overly sensitive to background disturbances for which no switch function is desired.

SUMMARY OF THE INVENTION

The present invention provides an antidisturbance switch employing a single conductive sphere enclosed within a cylindrical housing. A flexible printed circuit is attached to the inner wall of the cylindrical housing. An electrical circuit is formed between a conductive end of the cylindrical housing and the printed circuit grid through the conductive sphere. Relative movement of the housing and the sphere causes the electrical connection between the printed circuit grid and the end of the cylinder to be momentarily broken.

By adjusting the spacing of the conductors on the circuit grid and the relative radii of the conductive sphere and the cylindrical cavity, the sensitivity of the switch to background disturbances may be adjusted to the requirements of a desired application.

It is therefore an object of the present invention to provide an improved antidisturbance switch.

A further object of the invention is to provide an antidisturbance switch which has a sensitivity threshold which allows the switch to function when a desired disturbance is introduced and will retard the switch function when spurious background vibrations are applied.

These and further objects will become apparent to those skilled in the art upon examination of the following specification, the claims and the drawings.

DETAILED DESCRIPTION

Figure 2:
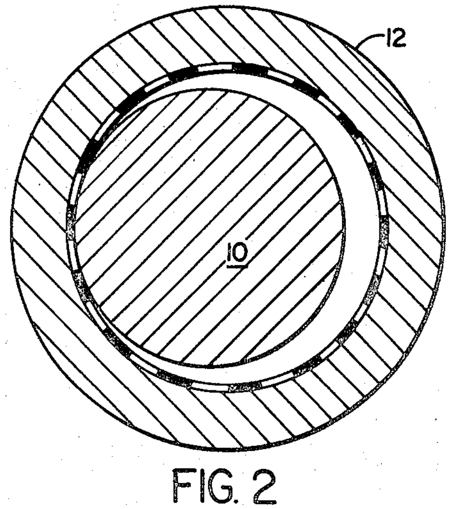
FIG. 2 is a cross-sectional view of the cylindrical housing and conductive sphere taken along a great circle of the conductive sphere.
Figure 1:
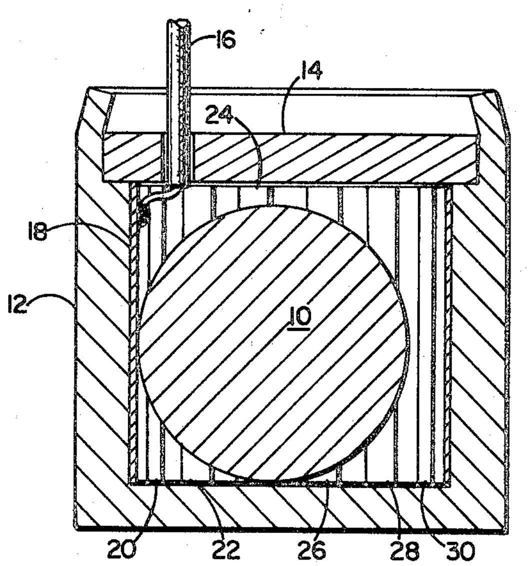
FIG. 1 is a cross-sectional view of an assembled antidisturbance switch.

Referring now to FIG. 1, a conductive sphere 10 is shown enclosed within a cylindrical housing 12. Cylindrical housing 12 in the preferred embodiment is formed from a single piece of conductive material having a substantially cylindrical chamber machined therein. Cylindrical housing 12 is sealed at the open end by a conductive cap 14. Although the entire cylindrical housing 12 in the preferred embodiment is formed from conductive material, it is not essential to the operation of the switch that the entire housing be conductive. Thus, a perfectly satisfactory switch may be constructed by forming nonconductive materials into a cylindrical shell and attaching conductive end caps thereto.

Conductive cap 14 has a diameter slightly larger than the diameter of the portion of the interior of the cylindrical housing 12 which contains conductive sphere 10. The remaining portion of cylindrical housing 12 is crimped over the end of cap 14 to hold it in place.

An insulated wire 16 is passed through a hole in connective cap 14 and is electrically connected to a printed circuit grid 18 which is enclosed by housing 12. Printed circuit grid 18 is formed from a flexible nonconductive sheet upon which a number of parallel and evenly spaced conductive strips 20, 22, 24, 26, 28, and 30 are deposited. In the preferred embodiment, only alternate conductive strips are actually attached to the conductor of insulated wire 16. Printed circuit grid 18 is inserted into the cylindrical housing 12 such that the conductive strips 20, 22, 24, 26, and 28 are aligned parallel to the longitudinal axis. The printed circuit grid may be glued to the interior wall of cylindrical housing 12 or, if the material is sufficiently elastic, may be snapped into place within the cylindrical housing 12 and held in place without further bonding. In the preferred embodiment, the conductive cap 14 and the conductive bottom of the cylindrical housing 12 have substantially planar interior surfaces and are electrically connected by the conductive walls of the cylindrical housing 12. The conductive strips, such as 22, are electrically insulated from the conductive cap 14 and the cylindrical housing 12.

The elements shown in FIG. 1 comprise an antidisturbance switch having a normally closed contact between the conductor of the insulated wire 16 and the conductive portions of the cylindrical housing 12 when the switch is in an undisturbed position. When the switch is disturbed, the normally closed electrical connection is momentarily interrupted.

The relationships between the various dimensions of the switch components affect the sensitivity of the switch to rotational movement and ambient background vibration. In a preferred embodiment, the inside diameter of the cylindrical housing 12 was chosen to be 0.180 inches and the diameter of the conductive sphere 0.125 inches. The height of the portion of cylindrical housing 12 enclosing the conductive sphere 10 was chosen to be 0.170 inches. The conductive strips in the preferred embodiment, such as strip 20, have a nominal width of 10 mils, a height of 1.4 mils and a separation from other conductive strips of 15 mils.

OPERATION

Figure 4:
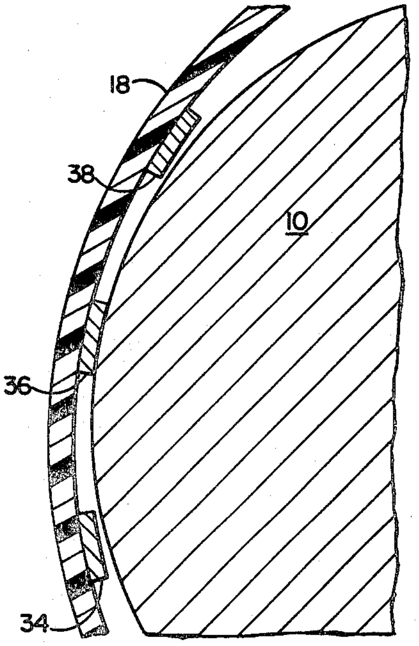
FIG. 4 depicts the same portion of FIG. 2 as FIG. 3 with the switch in a disturbed state.
Figure 3:
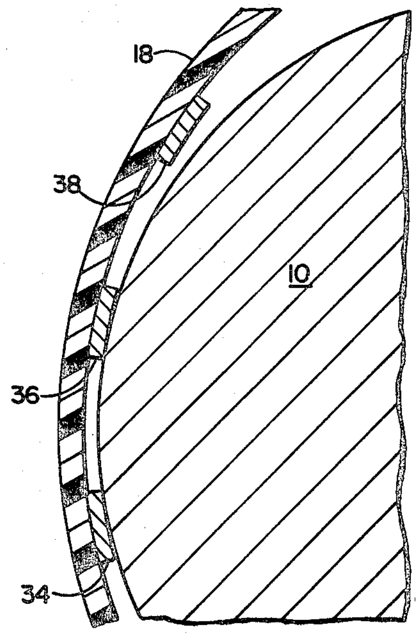
FIG. 3 is an enlargement of the portion of FIG. 2 depicting the interface of the conductive sphere and the printed circuit grid when the switch is in an undisturbed state.

The operation of the antidisturbance switch may be best understood by consideration of FIGS. 3 and 4. In FIG. 3, conductive sphere 10 is shown in contact with conductive strips 34 and 36. Since in the preferred embodiment, only alternate conductors are electrically connected to the conductor of insulated wire 16, it will be assumed that only conductors 34 and 38 are electrically connected to the insulated wire 16. The nonconnected strips need not be conductive. Since conductive sphere 10 is in contact with the bottom of the cylindrical housing 12 and with the conductive strip 34, an electrical connection is therefore formed between the conductor of the insulated wire 16 and the cylindrical housing 12.

When the conductive sphere 10 is moved in relation to the housing 12, the electrical connection between conductor strip 34 and conductive sphere 10 is broken resulting in a condition wherein conductive sphere 10 is only in contact with conductor 36 as shown in FIG. 4. Continued motion of the conductive sphere 10 will result in an electrical connection being formed between the conductive sphere 10 and both conductors 36 and 38, thus reestablishing the electrical connection between the cylindrical housing 12 and the conductor of insulated wire 16. Thus, a disturbance of the conductive sphere 10 within the cylindrical housing 12 results in a momentary opening of the electrical circuit between the insulated wire 16 and the cylindrical housing 12.

It can be seen that the condition illustrated in FIG. 3 is a normal condition when the cylindrical housing 12 and the conductive sphere 10 are at rest with the conductive sphere 10 supported by a pair of conductive strips such as 36 and 38. Because the conductive sphere 10 is supported at two points by the raised conductive strips, the rest position is relatively stable and a predetermined displacement of the conductive sphere 10 relative to the cylindrical housing 12 is required before the connection between the conductive sphere 10 and the conductive strip 34 is broken.

When the conductive sphere 10 is in the position shown in FIG. 4, the switch is in an open circuit condition because it is in contact with conductive strip 36 only and the condition is relatively unstable because of the single point of support between the conductive sphere 10 and the cylindrical housing 12. The relative instability of the open circuit condition wherein the ball is in contact with only a single conductive strip assures that the switch will be in a normally closed condition when the conductive sphere 10 is at rest and that the open circuit conditions occurring when the switch is disturbed will be momentary.

From the above description, it is apparent that many alterations maybe made of the switch disclosed without departing from the teaching of the invention. For example, although a conventional printed circuit with an insulated sheet and raised conductors is shown, the printed circuit grid could also be formed from a printed circuit having a conductive sheet insulated from the cylindrical housing and having rows of parallel insulators raised above the surface of the sheet to provide switching functions analogous to those described using printed circuits with raised conductors and an insulated backing.

A further modification would be to alter the spacing between the conductive strips such as 20 to a distance approximating 25 mils and connect all of the conductive strips to the conductor of the insulated wire 16. With the increase in spacing between the conductors, the conductive sphere 10 as it rolls along the inner wall of the cylindrical housing 12 will be momentarily electrically insulated from the conductive strips by single point of contact between the conductive sphere 10 and the insulated backing of the printed circuit grid 18.

A still further modification would be to alternate conductive and nonconductive strips on the printed circuit sheet. All of the conductive strips could then be connected to the conductor of the insulated wire 16.

It is also apparent that the relative sensitivity of the antidisturbance switch of the type disclosed may be altered by varying the radius of the conductive sphere 10 relative to the inside radius of the housing 12 and also by varying the size, spacing and thickness of the conductors such as 20 relative to the radius of the conductive sphere 10 and the inside radius of the cylindrical housing 12.

Other alterations and variations should be obvious to those skilled in the art. We do not wish to be limited to the specification of the preferred embodiment shown in the FIGS. but only by the following claims.

We claim:

1. Apparatus of the class described comprising, in combination:

a housing having a substantially cylindrical interior wall, and a conductive top and bottom;

a plurality of conductors enclosed by said housing and electrically insulated from the conductive top and bottom of said housing; and a conductive sphere enclosed within said housing and forming a conductive path between the conductive top or bottom of said housing and at least one of said plurality of conductors when said conductive sphere is at rest with respect to said conductive housing.

2. An antidisturbance switch comprising, in combination:

a cylindrical housing having conductive end portions;

a flexible printed circuit grid attached to the inner walls of said cylindrical housing, said flexible printed circuits grid having a plurality of equally spaced parallel conductive strips attached thereto;

conductive means insulated from said cylindrical housing connected to at least some of the conductive strips of said flexible printed circuit grid; and a conductive sphere enclosed within said cylindrical housing, said conductive sphere forming a normally conductive path between a conductive end portion of said cylindrical housing and said conductive means when said conductive sphere is at rest relative to said cylindrical housing and momentarily opening said conductive path when a disturbance of the switch causes said conductive sphere to move relative to said cylindrical housing.

3. Apparatus of the class described in claim 2, wherein said conductive means is an insulated wire.

4. Apparatus of the class described in claim 2, wherein said conductive means is connected to alternate conductive strips of said flexible printed circuit grid and wherein the spacing of the equally spaced parallel conductive strips of said flexible printed circuit grid is related to the radii of said conductive sphere and said cylindrical housing such that said conductive sphere when at rest is in contact with two adjacent conductive strips.

5. Apparatus of the class described in claim 2, wherein said conductive means is connected to all of the conductive strips of said flexible printed circuit grid and the spacing of the conductive strips of said flexible printed circuit grid is related to the radii of said conductive sphere and said cylindrical housing, such that the conductive sphere when at rest is in contact with only one of the conductive strips.

6. Apparatus as recited in claim 1 wherein the conducting top and conductive bottom of said housing have substantially planar interior surfaces.